US012571526B1

(12) United States Patent
Li

(10) Patent No.: US 12,571,526 B1
(45) Date of Patent: Mar. 10, 2026

(54) HEADLAMP WITH ELECTRICALLY CONDUCTIVE ELASTIC BAND

(71) Applicant: SYSMAX Innovations Co., Ltd., Guangdong (CN)

(72) Inventor: Wenjie Li, Guangzhou (CN)

(73) Assignee: SYSMAX Innovations Co., Ltd., Guangzhou (CN)

( * ) Notice: Subject to any disclaimer, the term of this patent is extended or adjusted under 35 U.S.C. 154(b) by 0 days.

(21) Appl. No.: 19/071,828

(22) Filed: Mar. 6, 2025

(30) Foreign Application Priority Data

Dec. 24, 2024 (CN) ........................ 202423206614.3

(51) Int. Cl.
*F21V 23/00* (2015.01)
*F21L 4/04* (2006.01)
*F21L 4/08* (2006.01)
*F21V 21/084* (2006.01)
*F21V 21/14* (2006.01)
*F21V 21/30* (2006.01)
*F21V 23/02* (2006.01)
*F21V 23/06* (2006.01)

(52) U.S. Cl.
CPC ............ *F21V 23/002* (2013.01); *F21L 4/045* (2013.01); *F21L 4/085* (2013.01); *F21V 21/084* (2013.01); *F21V 21/145* (2013.01); *F21V 21/30* (2013.01); *F21V 23/023* (2013.01); *F21V 23/06* (2013.01)

(58) Field of Classification Search
CPC .... F21V 23/002; F21V 21/084; F21V 21/145; F21V 21/30; F21V 23/023; F21V 23/001; F21L 4/045; F21L 4/085
USPC ................................................. 362/105, 106
See application file for complete search history.

(56) References Cited

U.S. PATENT DOCUMENTS 8,113,677 B2 * 2/2012 Carpenter .............. A42B 3/044 362/486
9,693,425 B2 6/2017 Feustel et al.
10,630,871 B2 * 4/2020 Salemnia ............... H04N 23/51
11,746,999 B1 * 9/2023 Ernst ................... F21V 23/0421 362/105
12,025,297 B2 7/2024 Ljunggren et al.
2016/0088890 A1 * 3/2016 Armagh ................. A42B 1/242 362/105
2017/0163860 A1 * 6/2017 Frank ..................... F16M 13/04

FOREIGN PATENT DOCUMENTS

EP 2126464 A1 12/2009

* cited by examiner

*Primary Examiner* — Laura K Tso
(74) *Attorney, Agent, or Firm* — Maier & Maier, PLLC

(57) ABSTRACT

A headlamp with an electrically conductive elastic band. The headlamp includes a band body having a wire area arranged at a predetermined position; a conductive wire arranged in the wire area along a stretching direction of the band body, and the conductive wire includes a plurality of continuously arranged adjustment parts, and the conductive wire corresponding to the plurality of adjustment parts is inclined along a predetermined arc relative to the stretching direction of the band body; a light source assembly electrically connected to one end of the conductive wire; and a power supply component electrically connected to another end of the conductive wire. The headlamp not only preserves the original wearing method of the headlamp but also eliminates the use of external wires, enhancing the product's aesthetics and operational stability.

9 Claims, 4 Drawing Sheets

HEADLAMP WITH ELECTRICALLY CONDUCTIVE ELASTIC BAND

CROSS-REFERENCE TO RELATED APPLICATIONS

The present application claims priority to Chinese Patent Application No. 202423206614.3, filed on Dec. 24, 2024, the content of all of which is incorporated herein by reference.

FIELD

The present disclosure relates to the field of outdoor wearable lamps, in particular to a headlamp with an electrically conductive elastic band.

BACKGROUND

With the continuous improvement in living standards, people's daily activities have become increasingly diverse. In various outdoor sports such as night running, trail running, cycling, adventure activities, fishing, and climbing, headlamps are essential equipment. Using a sports headlamp allows users to observe terrain features in the environment while keeping their hands free, enabling them to better handle unexpected situations.

In the prior art, the power supply module and the light source module of a sports headlamp are typically connected via external conductive wires to form a power supply circuit. For example, CN202674845U discloses a portable USB-rechargeable headlamp. However, external conductive wires generally have high stiffness, large size, and are positioned on one side of the band, which adversely affects the overall weight distribution of the headlamp. During vigorous movement, this can cause the conductive wires to sway or even pull the headlamp off, thereby impacting its usability.

Therefore, the prior art still needs to be improved and developed.

SUMMARY

To address the issue in the prior art where the external conductive wires of a headlamp affect its weight distribution and cause the wires to sway or even pull the headlamp off during vigorous movement, while the internal conductive wires embedded in the band cannot adapt to the stretchable function of the band, the present disclosure provides a headlamp with an electrically conductive elastic band.

The present disclosure is realized by the following technical solutions:

A headlamp with an electrically conductive elastic band which includes:

- a band body, the band body is an elastic band body, and the band body includes a wire area arranged at a predetermined position;
- a conductive wire, the conductive wire is a flexible conductive wire, and the conductive wire is arranged in the wire area along a stretching direction of the band body, and the conductive wire includes a plurality of continuously arranged adjustment parts, and the conductive wire corresponding to the plurality of adjustment parts is inclined along a predetermined arc relative to the stretching direction of the band body;
- a light source assembly, the light source assembly is arranged on the band body at a position corresponding to one end of the wire area, and the light source assembly is electrically connected to one end of the conductive wire;
- a power supply component, the power supply component is arranged on the band body at a position corresponding to another end of the wire area, and the power supply component is electrically connected to another end of the conductive wire.

In the headlamp with an electrically conductive elastic band, the plurality of adjustment parts are first adjustment units, each of the first adjustment units is S-shaped, and an axis of each of the first adjustment units is arranged parallel to the stretching direction of the band body, and the first adjustment units are arranged along a plane of the wire area.

In the headlamp with an electrically conductive elastic band, and/or, the plurality of adjustment parts are second adjustment units;

- an elastic support member is arranged in the band body along the stretching direction of the band body, each of the second adjustment units is spring-shaped and wound around the elastic support member, and the second adjustment units are sleeved in the wire area.

In the headlamp with an electrically conductive elastic band, a plurality of elastic support members are provided, the plurality of elastic support members are evenly arranged in the wire area along a width direction of the band body, and an elastic coefficient of the elastic support members is adapted to an elastic coefficient of the band body.

In the headlamp with an electrically conductive elastic band, and/or, the plurality of adjustment parts are third adjustment units, and each of the third adjustment unit is S-shaped;

- an elastic webbing is arranged on one side of the band body corresponding to the conductive wire, an axis of each of the third adjustment units is arranged parallel to a stretching direction of the elastic webbing and each of the third adjustment units is point-fixedly connected to the elastic webbing; the third adjustment units are arranged along the plane of the wire area.

In the headlamp with an electrically conductive elastic band, a plurality of elastic webbings are provided, the plurality of elastic webbings are evenly arranged in the wire area along the width direction of the band body, and an elastic coefficient of the elastic webbings is adapted to the elastic coefficient of the band body.

In the headlamp with an electrically conductive elastic band, the light source assembly includes:

- a fixing member, the fixing member is detachably arranged on the band body, and one end of the conductive wire extends and passes through the fixing member;
- a light emitting member, the light emitting member is arranged on the fixing component and is electrically connected to the end of the conductive wire passing through the fixing member.

In the headlamp with an electrically conductive elastic band, an electrically conductive base is provided on both sides of the fixing member, a rotating shaft is extended from the electrically conductive base, and the light emitting member is damply and rotatably arranged on the rotating shaft.

In the headlamp with an electrically conductive elastic band, the power supply assembly includes a power supply plug arranged on one side of the power supply assembly, the other end of the conductive wire is connected to a power supply interface, and the power supply plug is detachably and electrically connected to the power supply interface.

In the headlamp with an electrically conductive elastic band, a connecting member for connecting two ends of the band body is provided on the band body, and the power supply interface is provided on the connecting member.

The beneficial effect of the present disclosure is that the present disclosure provides an improvement by configuring a wire area on the elastic band body and continuously arranging several adjustment parts on the flexible conductive wire within the wire area. This design allows the conductive wire to provide adaptive stretching space when the band body is stretched, thereby concealing the conductive wire that connects the light source assembly and the power supply component within the band body. This not only preserves the original wearing method of the headlamp but also eliminates the use of external wires, enhancing the product's aesthetics and operational stability.

DETAILED DESCRIPTION OF EMBODIMENTS

In order to make the purpose, technical solution and effect of the present disclosure clearer and more specific, the present disclosure is further described in detail with reference to the accompanying drawings and examples. It should be understood that the specific embodiments described here are only used to explain the present disclosure and are not used to limit the present disclosure.

It should be noted that if the embodiments of the present disclosure involve directional indications (such as up, down, left, right, front, back . . . ), the directional indications are only used to explain the relative position relationship, movement status, etc. between the components under a certain specific posture (as shown in the accompanying drawings). If the specific posture changes, the directional indications will also change accordingly.

In addition, if there are descriptions involving "first", "second", etc. in the embodiments of the present disclosure, the descriptions of "first", "second", etc. are only used for descriptive purposes and cannot be understood as indicating or suggesting their relative importance or implicitly indicating the number of the indicated technical features. Therefore, the features defined as "first" and "second" may explicitly or implicitly include at least one of the features. In addition, the technical solutions between the various embodiments can be combined with each other, but they must be based on the ability of ordinary technicians in the field to implement them. When the combination of technical solutions is contradictory or cannot be implemented, it should be deemed that such a combination of technical solutions does not exist and is not within the scope of protection required by the present disclosure.

In the prior art, the power supply module and the light source module of a sports headlamp are typically connected via external conductive wires to form a power supply circuit. For example, CN202674845U discloses a portable USB-rechargeable headlamp. However, external conductive wires generally have high stiffness, large size, and are positioned on one side of the band, which adversely affects the overall weight distribution of the headlamp. During vigorous movement, this can cause the conductive wires to sway or even pull the headlamp off, thereby impacting its usability.

Figure 1:
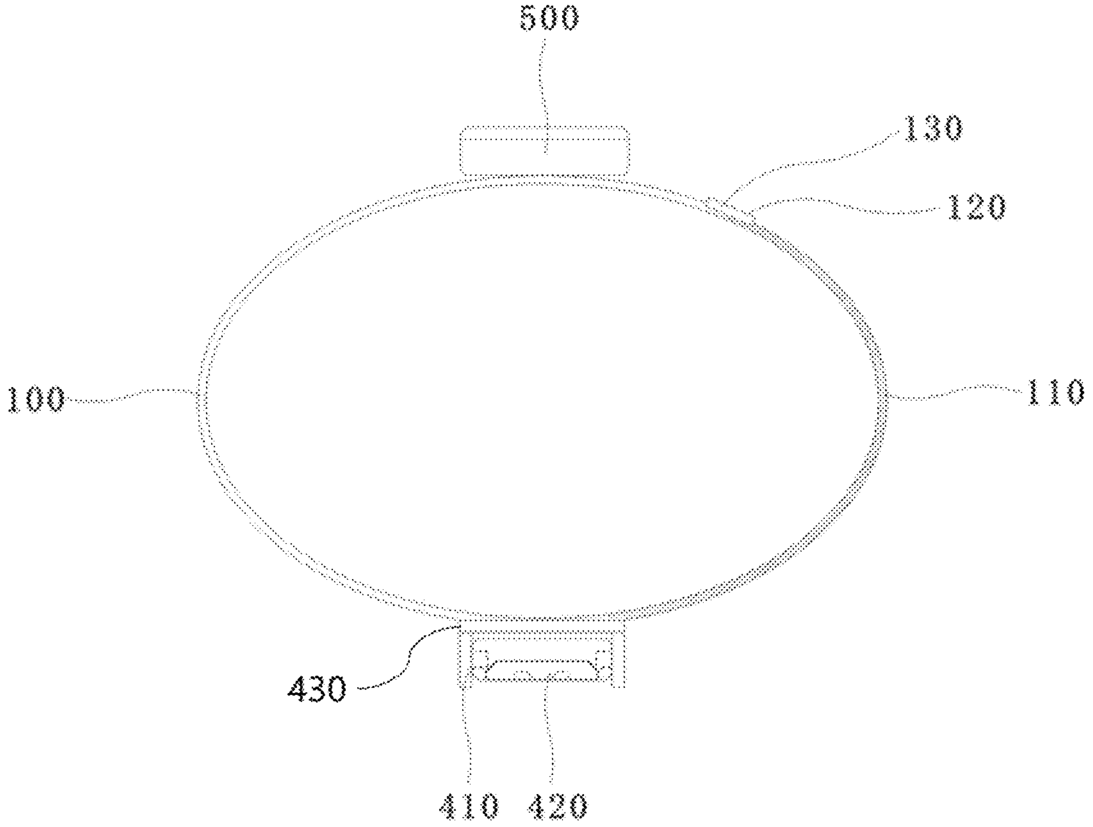
FIG. 1 is a schematic structural diagram of a headlamp with an electrically conductive elastic band according to the present disclosure.
Figure 2:
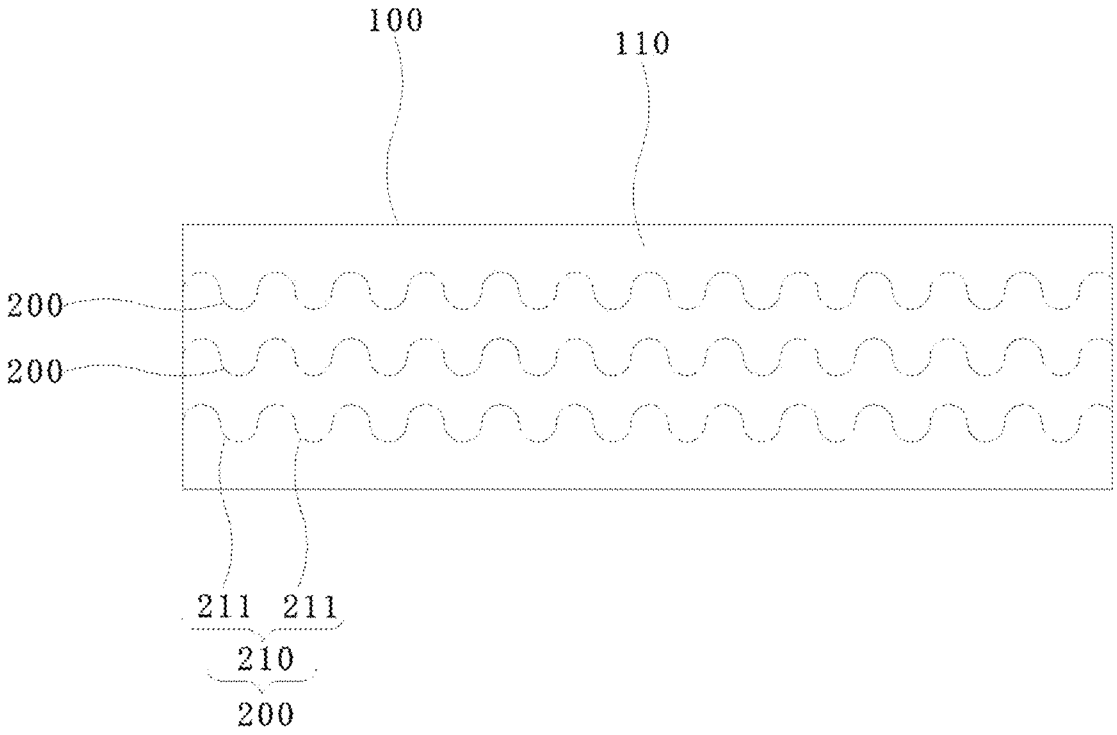
FIG. 2 is a schematic structural diagram of an adjustment part of a headlamp with an electrically conductive elastic band according to the first embodiment of the present disclosure.

Based on the above problem in the prior art, the present disclosure provides a headlamp with an electrically conductive elastic band, as shown in FIG. 1 and FIG. 2, the headlamp with an electrically conductive elastic band includes: a band body, which is an elastic band body, and the band body includes a wire area arranged at a predetermined position; a conductive wire, which is a flexible conductive wire, and the conductive wire is arranged in the wire area along the stretching direction of the band body, and the conductive wire includes a plurality of continuously arranged adjustment parts, and the conductive wires corresponding to the adjustment parts are inclined along a predetermined arc relative to the stretching direction of the band body; a light source assembly, which is arranged at a position on the band body corresponding to one end of the wire area, and the light source assembly is circuit-connected to one end of the conductive wire; a power supply assembly, which is arranged at a position on the band body corresponding to the other end of the wire area, and the power supply assembly is circuit-connected to the other end of the conductive wire.

The present disclosure provides a wire area on the elastic band body, and continuously provides a plurality of adjustment parts on the flexible conductive wire and arranges them in the wire area, so that when the band body is stretched, the conductive wire can provide an adaptive stretching space, thereby hiding the conductive wire connecting the light source component and the power supply component in the band body, which does not affect the original wearing method of the headlamp and avoids the use of external wires, thereby improving the appearance and stability of the product.

In the above embodiment, as shown in FIG. 1, the main body of the headlamp with an electrically conductive elastic band of the present disclosure is composed of a band body 100 and a conductive wire 200, a light source assembly 400 and a power supply assembly 500, wherein the band body 100 is made of elastic cloth material, and the conductive wire 200 is arranged at a predetermined area inside the band body 100. For ease of description, the predetermined area is named as a wire area 110 in the present embodiment. Those skilled in the art can understand that the wire area 110 is only a partial area on the band body 100, and the specific area can be set according to actual usage requirements.

The conductive wire 200 should be a flexible conductive wire 200, which can adjust its shape under the condition of force, and a relatively thin conductive wire 200 is used to reduce the overall weight of the elastic fabric with an electrification function. In the present embodiment, the conductive wire 200 is arranged in the above-mentioned wire area 110 along the length direction of the band body 100. It should be noted that the conductive wire 200 is not arranged along a straight line, but is arranged at a certain arc and inclination angle to provide an adaptive deformation margin of the conductive wire 200 when the band body 100 is stretched. In the present embodiment, the arrangement shape of the conductive wire 200 inside the wire area 110 is named as an adjustment part 210 for the convenience of subsequent explanation. It should be noted that a plurality of adjustment parts 210 are provided and are arranged continuously. Specifically, the conductive wire 200 corresponding to the adjustment part 210 is inclined along a predetermined arc relative to the length direction of the band body 100, thereby forming a continuous telescopic structure corresponding to the band body 100. In actual production, the conductive wire 200 corresponding to the plurality of adjustment parts 210 are fixedly connected to the band body 100 of the wire area 110 by points or parts to maintain a preset shape. When the band body 100 is extended or retracted, the plurality of adjustment parts 210 move with the band body 100, and stretch in the process in a straightened direction. When the band body 100 contracts under the action of its own elastic force, the plurality of adjustment parts 210 move with the band body 100 and reset to the initial arrangement position. Therefore, when the elastic fabric with an electrification function is applied to a headlamp, it can replace the external conductive wire of a traditional headlamp, thereby preventing the conductive wire 200 from swinging when the user moves significantly.

The light source assembly 400 is used for lighting. The light source assembly 400 can be detachably arranged on the band body 100 and corresponds to one end of the wire area 110. One end of the conductive wire 200 in the wire area 110 extends to the position of the light source assembly 400 and is connected to the light source assembly 400 to form a power supply circuit. At the same time, the power supply assembly 500 can be detachably arranged on the band body 100 and corresponds to the other end of the wire area 110. The other end of the conductive wire 200 in the wire area 110 extends to the position of the light source assembly 400 and is connected to the power supply assembly 500 to form a complete circuit in which the power supply assembly 500 is connected to the light source assembly 400 circuit. In actual use, the power supply assembly 500 can provide electrical power to the light source assembly 400 to ensure the use of the headlight lighting function.

Figure 5:
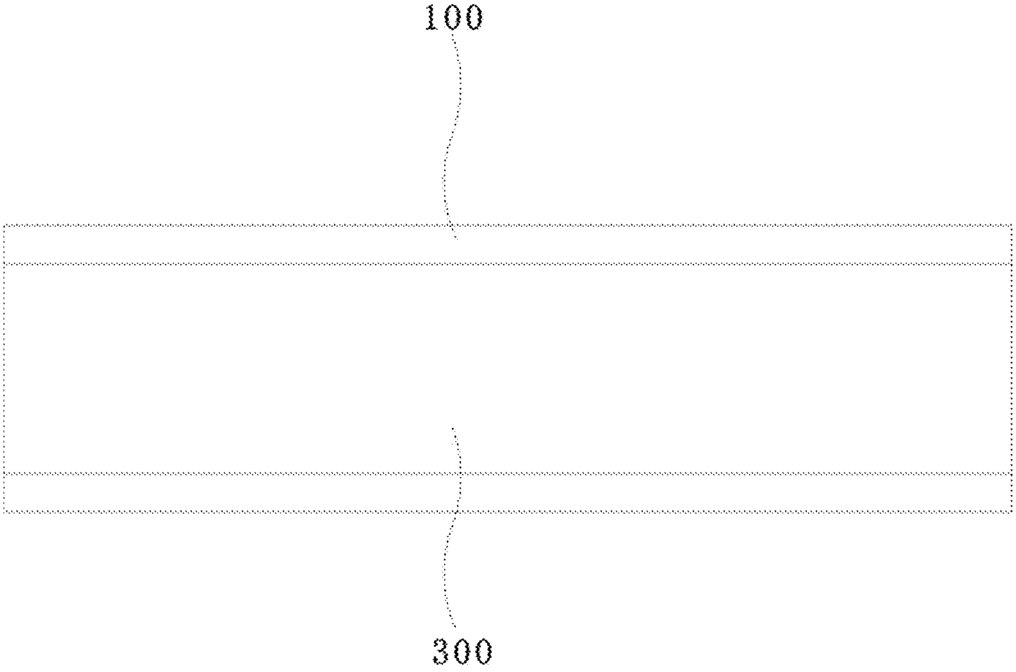
FIG. 5 is a schematic diagram of an inner structure of a band body of the headlamp with an electrically conductive elastic band according to the present disclosure.

In the present embodiment, the band body 100 is formed into a ring shape as shown in FIG. 1, and is used to fit around the user's head. To ensure that the center of gravity is stable when the user wears the band body 100, the light source assembly 400 and the power supply assembly 500 should be arranged relatively to each other, so that the light source assembly 400 is located at the forehead and the power supply assembly 500 is located at the back of the head during wearing, so that the overall center of gravity of the head-mounted lamp is close to the center of the head. In the present embodiment, as shown in FIG. 5, the wire area 110 is the right side of the band body 100, which can realize the connection between the light source assembly 400 and the power supply assembly 500 while hiding the conductive wire 200 to the greatest extent, thereby improving the integrity of the head-mounted lamp.

Based on the above embodiments, the shape setting of the adjustment part 210 can have various types. In the first embodiment of the present disclosure, as shown in FIG. 2, the adjustment part 210 is a first adjustment unit 211. Specifically, the shape of the first adjustment unit 211 is "S"-shaped, that is, the shape of the conductive wire 200 at the position of the first adjustment unit 211 is arranged in an "S" shape, and the axis of the first adjustment unit 211 is arranged parallel to the length direction of the band body 100. A plurality of first adjustment units 211 form a quasi-overlapping state with a spacing as shown in FIG. 1. At the same time, the plurality of first adjustment units 211 are arranged along a plane in the wire area 110. The advantage of such a setting is that on the one hand, the conductive wire 200 can be provided with redundancy for the above-mentioned stretching of the band body 100, and on the other hand, the thickness of the band body 100 can be ensured to be thin, thereby meeting the user's demand for lightweight wearing.

Figure 3:
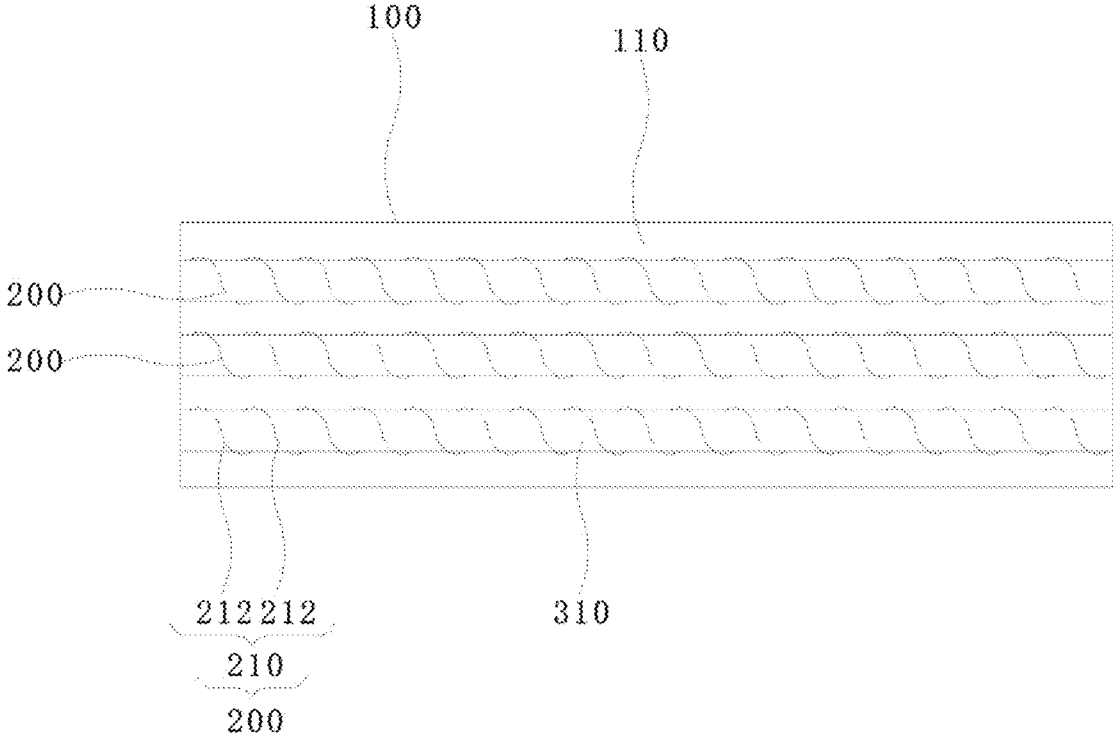
FIG. 3 is a schematic structural diagram of an adjustment part of a headlamp with an electrically conductive elastic band according to the second embodiment of the present disclosure.

Further, in the second embodiment of the present disclosure, as shown in FIG. 3, the adjustment part 210 is a second adjustment unit 212. Specifically, in the present embodiment, the interior of the band body 100 is further provided with an elastic support member 310 arranged along the length direction of the band body 100. The elastic support member 310 can be made of a material with telescopic elasticity, and can be made of rubber, silicone and other materials. It should be noted that the elastic coefficient of the elastic support member 310 should be adapted to the elastic coefficient of the band body 100 to ensure the comfort of the user during wearing and avoid a sense of tightness. In the present embodiment, the second adjustment unit 212 is spring-shaped and wound around On the elastic support member 310, a spring-like stretching mechanism is formed. When the elastic support member 310 is stretched along with the band body 100, the length of the elastic support member 310 increases and the diameter area decreases. The ring structure of the second adjustment unit 212 follows the stretching, thereby achieving the same effect of arranging the conductive wire 200 inside the band body 100 as in the above embodiment. In the present embodiment, a plurality of second adjustment units 212 are arranged in the wire area 110 in the form of a sleeve, so that the conductive wire 200 can provide redundancy for the above-mentioned stretching of the band body 100, and the band body 100 can be made round and beautiful, thereby meeting the user's personalized wearing needs.

In this embodiment, as shown in FIG. 3, the elastic support member 310 can be specifically set to a plurality of bands for adapting to the arrangement of a plurality of conductive wires 200. When specifically set, a plurality of elastic support members 310 are evenly arranged along the width direction of the band body 100, so that the elasticity of the band body 100 is uniform during the stretching process, thereby ensuring the comfort when it is fitted on the user's skin surface. In this embodiment, the elastic coefficient of the elastic support member 310 should be equal to or greater than the elastic coefficient of the band body 100, so as to avoid the elastic support member 310 from causing a sense of tightness to the user due to the large elastic force after the elastic support member 310 follows the stretching of the band body 100, and also to avoid the second adjustment unit 212 wound around the elastic support member 310 from causing stress concentration on the user's skin and causing discomfort.

Figure 4:
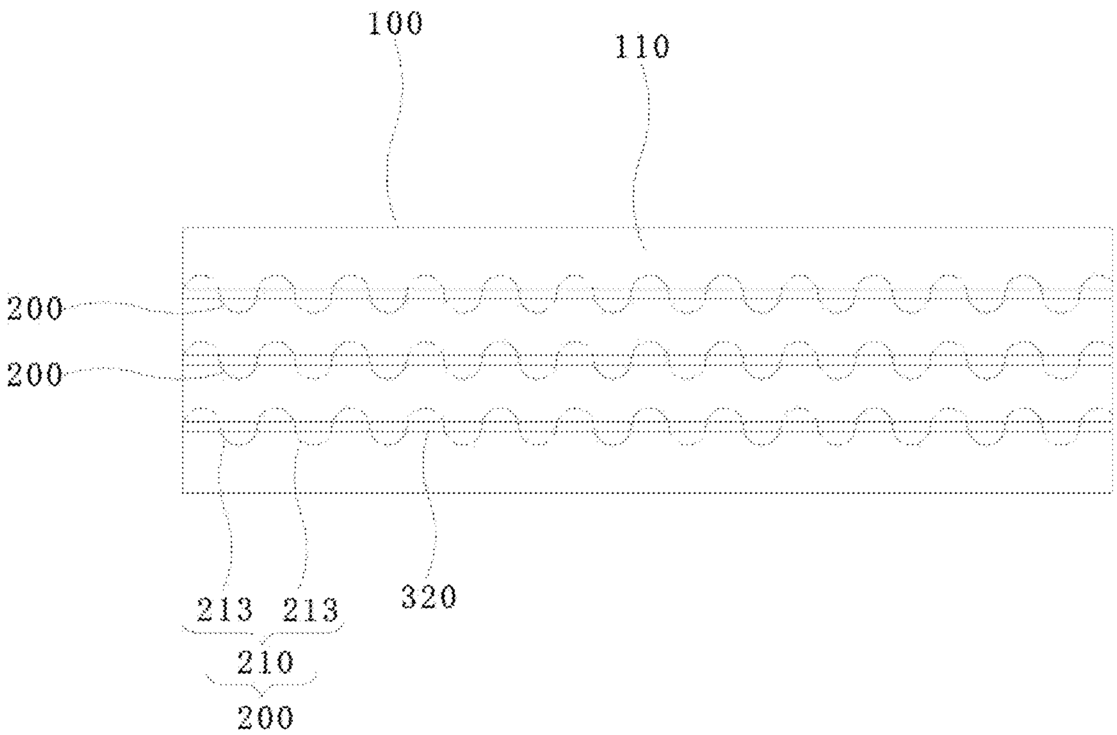
FIG. 4 is a schematic structural diagram of an adjustment part of a headlamp with an electrically conductive elastic band according to the third embodiment of the present disclosure.

Furthermore, in the third embodiment of the present disclosure, as shown in FIG. 4, the adjustment part 210 is a third adjustment unit 213. Specifically, in the present embodiment, one side of the band body 100 is further provided with an elastic webbing 320 arranged along the length direction of the band body 100. The elastic webbing 320 is made of a fabric with retractable elasticity. The elastic coefficient of the elastic webbing 320 is adapted to the elastic coefficient of the band body 100 to ensure the comfort of the user during wearing and avoid a tight feeling. In the present embodiment, the third adjustment unit 213 is formed in an "S" shape, and the axis of the third adjustment unit 213 is parallel to the length direction of the elastic webbing 320. A plurality of third adjustment units 213 are arranged to form a quasi-overlapping state with a spacing as shown in FIG. 3. At the same time, the plurality of third adjustment units 213 are arranged along the plane in the wire area 110. During the specific production, the elastic webbing 320 and the points corresponding to the plurality of third adjustment units 213 can be fixedly connected by stitching or gluing, etc., so as to achieve the effect of making the conductive wire 200 retractable and fixed on the band body 100 at the same time. Thus, on the one hand, the conductive wire 200 can be provided with redundancy for the stretching of the band body 100 as mentioned above, and on the other hand, the thickness of the band body 100 can be ensured to be thin, so as to meet the user's demand for lightweight wearing.

In this embodiment, as shown in FIG. 4, a plurality of elastic webbing 320 can be set for adapting to the arrangement of a plurality of conductive wires 200. When the present set, the plurality of elastic webbings 320 are evenly arranged along the width direction of the band body 100, so that the elasticity of the band body 100 is uniform during the stretching process, thereby ensuring the comfort when it fits on the user's skin surface. In this embodiment, the elastic coefficient of the elastic webbing 320 should be equal to or greater than the elastic coefficient of the band body 100, so as to avoid the elastic support member 310 from causing a sense of tightness due to stress concentration on the user due to the large elastic force after the band body 100 is stretched.

In the above embodiments, the first embodiment, the second embodiment and the third embodiment can be used independently in different models of elastic fabrics with electrification function, and can be used simultaneously in some models. In addition, there are other types of arrangements of the adjustment part 210, for example, the adjustment unit can be set to a "Z" shape, a "U" shape, etc.

In the above embodiments, as shown in FIG. 2, FIG. 3 and FIG. 4, a plurality of conductive wires 200 may be provided in the above different specific embodiments to meet the requirements of using different elastic fabrics with electrification functions in different devices. In the specific settings, a plurality of conductive wires 200 are evenly arranged in the wire area 110 along the width direction of the band body 100 to avoid entanglement during the stretching and resetting process.

In another possible implementation of the present disclosure, as shown in FIG. 5, an antiperspirant band 300 is further provided on one side (outer side) of the band body 100 corresponding to the wire area 110, and the antiperspirant band 300 is made of cotton material in the prior art and waterproof material at the connection position with the band body 100. The side where the antiperspirant band 300 is located fits the user's skin during actual use, and can absorb sweat during the user's exercise to prevent sweat from flowing into the eyes and causing blurred vision. At the same time, the antiperspirant band 300 also serves to isolate sweat from contacting the conductive wire 200, thereby reducing the contact between sweat and the conductive wire 200, so as to avoid the conductive wire 200 from being damaged by long-term sweat invasion and corrosion.

In one possible implementation of the present disclosure, as shown in FIG. 1, the above-mentioned light source assembly 400 is specifically composed of a fixing member 410 and a light emitting member 420, wherein the fixing member 410 is detachably arranged on the band body 100 to form a base structure, one end of the above-mentioned conductive wire 200 extends to the position of the fixing member 410, and passes through the fixing member 410 to form a circuit connection with the light emitting member 420, and the light emitting member 420 is arranged on the fixing member 410, and can be specifically arranged to be a rotating connection to meet the user's needs for adjusting the lighting angle in different usage scenarios.

Figure 6:
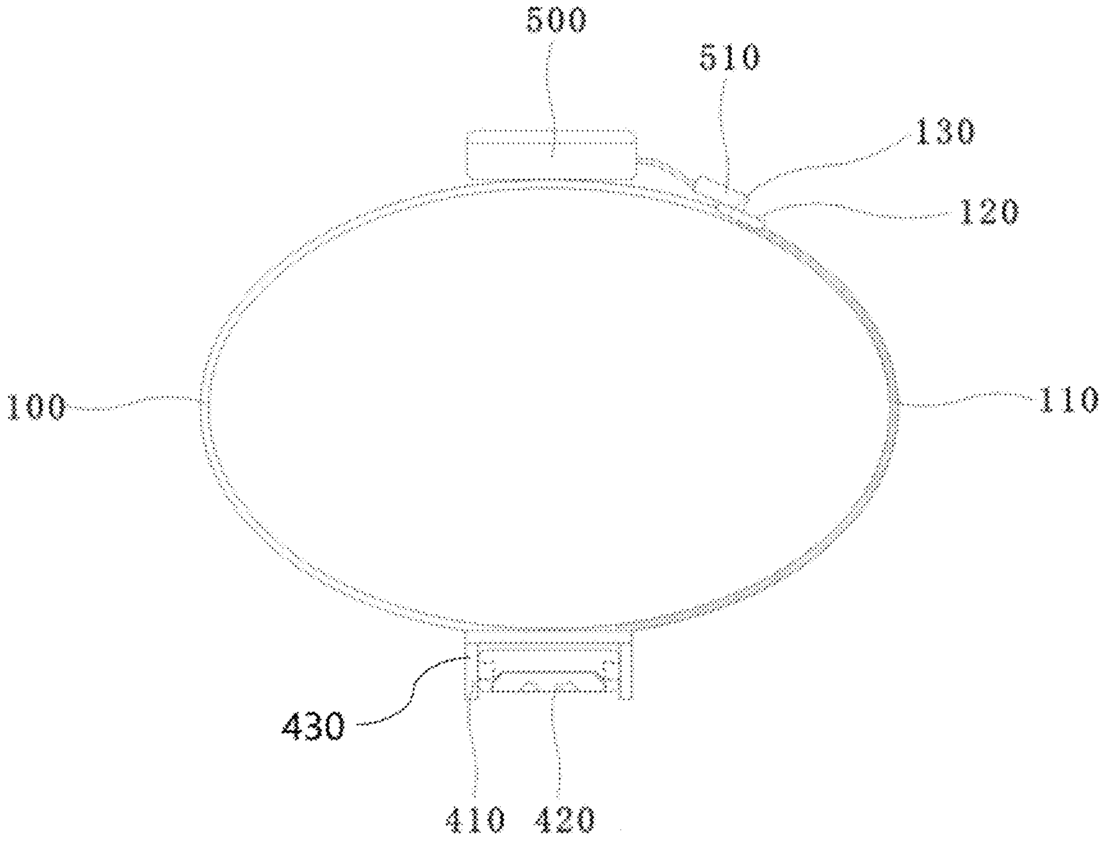
FIG. 6 is a schematic structural diagram of a headlamp with an electrically conductive elastic band according to another embodiment of the present disclosure.

In a specific embodiment, as shown in FIGS. 1 and 6, both ends of the fixing member 410 are provided with an electrically conductive 430, and a rotating shaft is extended from the electrically conductive 430. Specifically, both sides of the main body of the fixing member 410 away from the band body 100 are provided with an electrically conductive 430, and a rotating shaft is extended from the electrically conductive 430, thereby providing an installation basis for the installation of the light emitting member 420. Both ends of the light emitting member 420 are rotatably arranged on the rotating shaft, so that the irradiation direction of the light emitting member 420 corresponds to the front, and it also has the function of rotating upward or downward adjustment. The light emitting member 420 is rotatably connected to the fixing member 410. The connection part is preferably set with a damping shaft, so that the relative angle between the light emitting member 420 and the fixing member 410 can be automatically fixed, so as to avoid the situation where the light emitting member 420 is affected by gravity and inertia and rotates due to the large amplitude of user movement. It can be understood that in this embodiment, the shaft can be a hollow shaft, and the light emitting member 420 is connected to the conductive wire 200 through the hollow part of the shaft. In addition, the electrically conductive base 430 and the fixing member 410 can be fixedly connected by magnetic attraction+contact or slot+contact, so as to achieve conduction between the light emitting member 420 and the conductive wire 200.

In another possible implementation of the present disclosure, as shown in FIG. 6, the power supply assembly 500 is mostly a battery, which is a detachable structure in common head-mounted lamps to increase the battery life of the head-mounted lamps. Therefore, in this embodiment, in order to connect the power supply assembly 500 with the conductive wire 200, a power supply interface 120 is also provided on the band body 100. The power supply interface 120 is circuit-connected to the other end of the conductive wire 200. The power supply interface 120 is fixedly connected to the band body 100 and is arranged at a position close to the power supply assembly 500. An extended power supply terminal is also provided on the power supply assembly 500, which is adapted to the power supply interface 120 to achieve a detachable connection, thereby facilitating installation and replacement while satisfying the circuit connection of the above-mentioned power supply assembly 500 with the light source assembly 400.

Furthermore, as shown in FIG. 6, a connecting member 130 is further provided on the band body 100. The connecting member 130 is used to connect the two free ends of the band body 100 to form a ring, or to adjust the diameter and length of the band body 100 formed in a ring to meet the use requirements of different users' head circumferences. Specifically, the connecting member 130 can be provided with a structure such as a Japanese buckle. In this embodiment, in order to simplify the structure of the head-mounted headlamp, the power supply interface 120 can be provided on the connecting member 130, so as to realize the function of combining the band body 100 into a ring while also realizing the function of cooperating with the connection circuit, so as to reduce the accessories in the head-mounted headlamp as much as possible and thus reduce the overall weight.

Based on the above embodiments, the actual use process of the headlamp with an electrically conductive elastic band of the present disclosure is as follows:

The user adjusts the diameter of the band body 100 and installs the light source assembly 400 and the power supply assembly 500 at predetermined positions of the band body 100, respectively, wherein the light source assembly 400 is circuit-connected to the conductive wire 200 located at one end of the wire area 110, and the power supply assembly 500 is connected to the power supply interface 120 at the other end of the wire area 110 through the power supply plug 510, thereby forming a connecting circuit between the light source assembly 400 and the power supply assembly 500, and then the head-mounted lamp can be put on the head.

During actual wearing, the band body 100 may be stretched. Since the present disclosure arranges the conductive wire 200 inside the band body 100 and also arranges the adjustment part 210, it can be adjusted to adapt to the stretched state without affecting the normal use of the conductive wire 200.

When the user performs intense and large-scale exercises, the built-in conductive wire 200 will not shake, thereby improving the integrity of the head-mounted lamp and ensuring the stability of the center of gravity during the wearing process of the head-mounted lamp.

In summary, the present disclosure provides a headlamp with an electrically conductive elastic band, the headlamp with an electrically conductive elastic band comprising: a band body, the band body is an elastic band body, the band body includes a wire area arranged at a predetermined position; a conductive wire, the conductive wire is a flexible conductive wire, the conductive wire is arranged in the wire area along the stretching direction of the band body, the conductive wire includes a plurality of continuously arranged adjustment parts, the conductive wire corresponding to the adjustment part is inclined along a predetermined arc relative to the stretching direction of the band body; a light source assembly, the light source assembly is arranged at a position corresponding to one end of the wire area on the band body, and the light source assembly is connected to one end of the conductive wire by circuit; a power supply assembly, the power supply assembly is arranged at a position corresponding to the other end of the wire area on the band body, and the power supply assembly is connected to the other end of the conductive wire by circuit. The present disclosure sets a wire area on the elastic band body, and continuously sets a plurality of adjustment parts on the flexible conductive wire and arranges them in the wire area, so that the conductive wire can provide an adaptive stretching space when the band body is stretched, thereby hiding the conductive wire connecting the light source assembly and the power supply assembly in the band body, which does not affect the original wearing method of the headlamp, and avoids the use of external wires, thereby improving the product appearance and use stability.

It should be understood that the application of the present disclosure is not limited to the above examples. For ordinary technicians in this field, improvements or changes can be made according to the above description. All these improvements and changes should fall within the scope of protection of the claims attached to the present disclosure.

What is claimed is:

1. A headlamp with an electrically conductive elastic band, comprising:

a band body, the band body is an elastic band body, and the band body comprises a wire area arranged at a predetermined position;

a conductive wire, the conductive wire is a flexible conductive wire, and the conductive wire is arranged in the wire area along a stretching direction of the band body, and the conductive wire comprises a plurality of continuously arranged adjustment parts, and the conductive wire corresponding to the plurality of adjustment parts is inclined along a predetermined arc relative to the stretching direction of the band body, the plurality of adjustment parts are first adjustment units, each of the first adjustment units is S-shaped, an axis of each of the first adjustment units is arranged parallel to the stretching direction of the band body, and the first adjustment units are arranged along a plane of the wire area;

a light source assembly, the light source assembly is arranged on the band body at a position corresponding to one end of the wire area, and the light source assembly is electrically connected to one end of the conductive wire; and a power supply component, the power supply component is arranged on the band body at a position corresponding to another end of the wire area, and the power supply component is electrically connected to another end of the conductive wire.

2. The headlamp with an electrically conductive elastic band according to claim 1, wherein the plurality of adjustment parts are second adjustment units; and an elastic support member is arranged in the band body along the stretching direction of the band body, each of the second adjustment units is spring-shaped and wound around the elastic support member, and the second adjustment units are sleeved in the wire area.

3. The headlamp with an electrically conductive elastic band according to claim 2, wherein a plurality of elastic support members are provided, the plurality of elastic support members are evenly arranged in the wire area along a width direction of the band body, and an elastic coefficient of the elastic support members is adapted to an elastic coefficient of the band body.

4. The headlamp with an electrically conductive elastic band according to claim 1, wherein the plurality of adjustment parts are third adjustment units, and each of the third adjustment units is S-shaped; and an elastic webbing is arranged on one side of the band body corresponding to the conductive wire, an axis of each of the third adjustment units is arranged parallel to a stretching direction of the elastic webbing and each of the third adjustment units is point-fixedly connected to the elastic webbing; the third adjustment units are arranged along the plane of the wire area.

5. The headlamp with an electrically conductive elastic band according to claim 4, wherein a plurality of elastic webbings are provided, the plurality of elastic webbings are evenly arranged in the wire area along the width direction of the band body, and an elastic coefficient of the elastic webbings is adapted to the elastic coefficient of the band body.

6. The headlamp with an electrically conductive elastic band according to claim 1, wherein the light source assembly comprises:

a fixing member, the fixing member is detachably arranged on the band body, and one end of the conductive wire extends and passes through the fixing member; and a light emitting member, the light emitting member is arranged on the fixing component and is electrically connected to the end of the conductive wire passing through the fixing member.

7. The headlamp with an electrically conductive elastic band according to claim 6, wherein an electrically conductive base is arranged on both sides of the fixing member, a rotating shaft is extended from the electrically conductive base, and the light emitting member is damply and rotatably arranged on the rotating shaft.

8. The headlamp with an electrically conductive elastic band according to claim 1, wherein the power supply assembly comprises a power supply plug arranged on one side of the power supply assembly, the other end of the conductive wire is connected to a power supply interface, and the power supply plug is detachably and electrically connected to the power supply interface.

9. The headlamp with an electrically conductive elastic band according to claim 8, wherein a connecting member configured to connect two ends of the band body is arranged on the band body, and the power supply interface is arranged on the connecting member.

* * * * *